Jan. 10, 1967  C. R. GRAUEL  3,296,834
UNIVERSAL JOINT
Filed Feb. 18, 1965  2 Sheets-Sheet 1
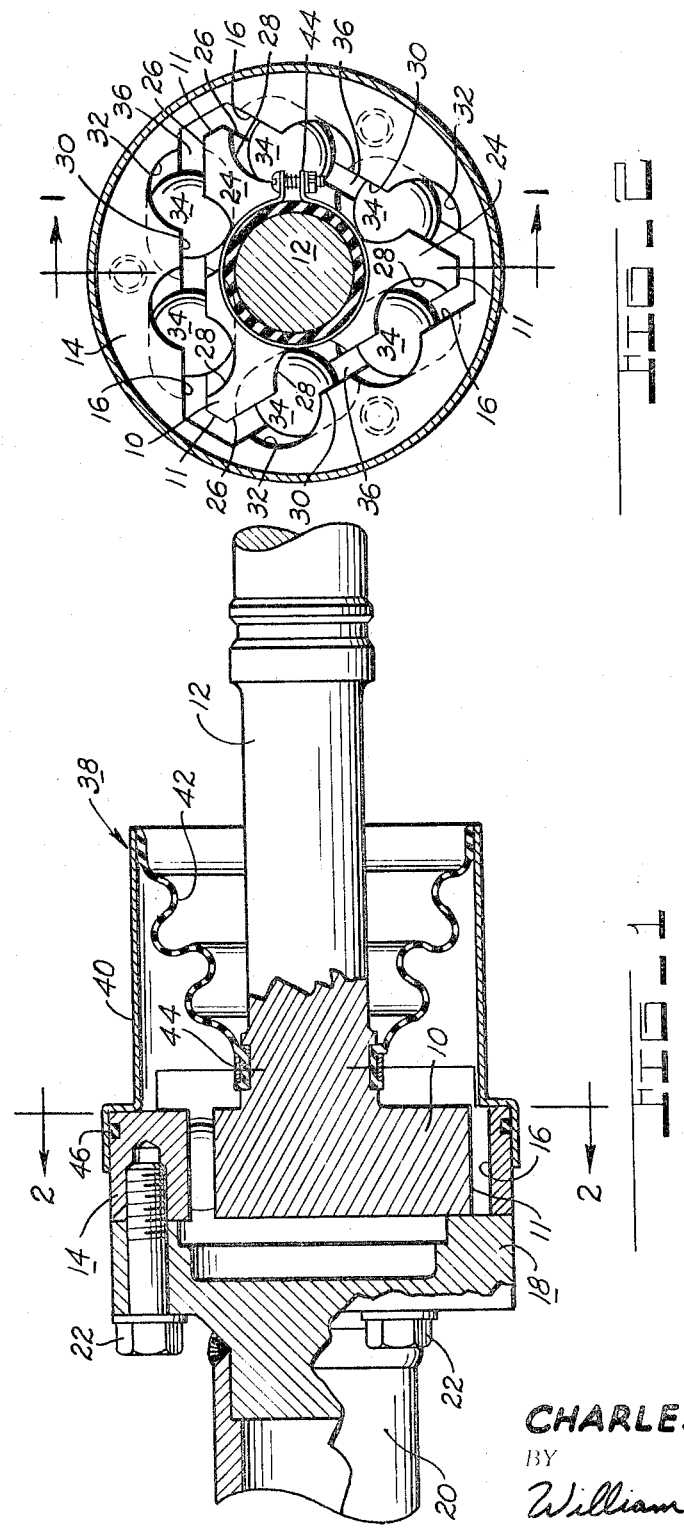
INVENTOR.
CHARLES R. GRAUEL
BY
William N. Antonis
ATTORNEY.

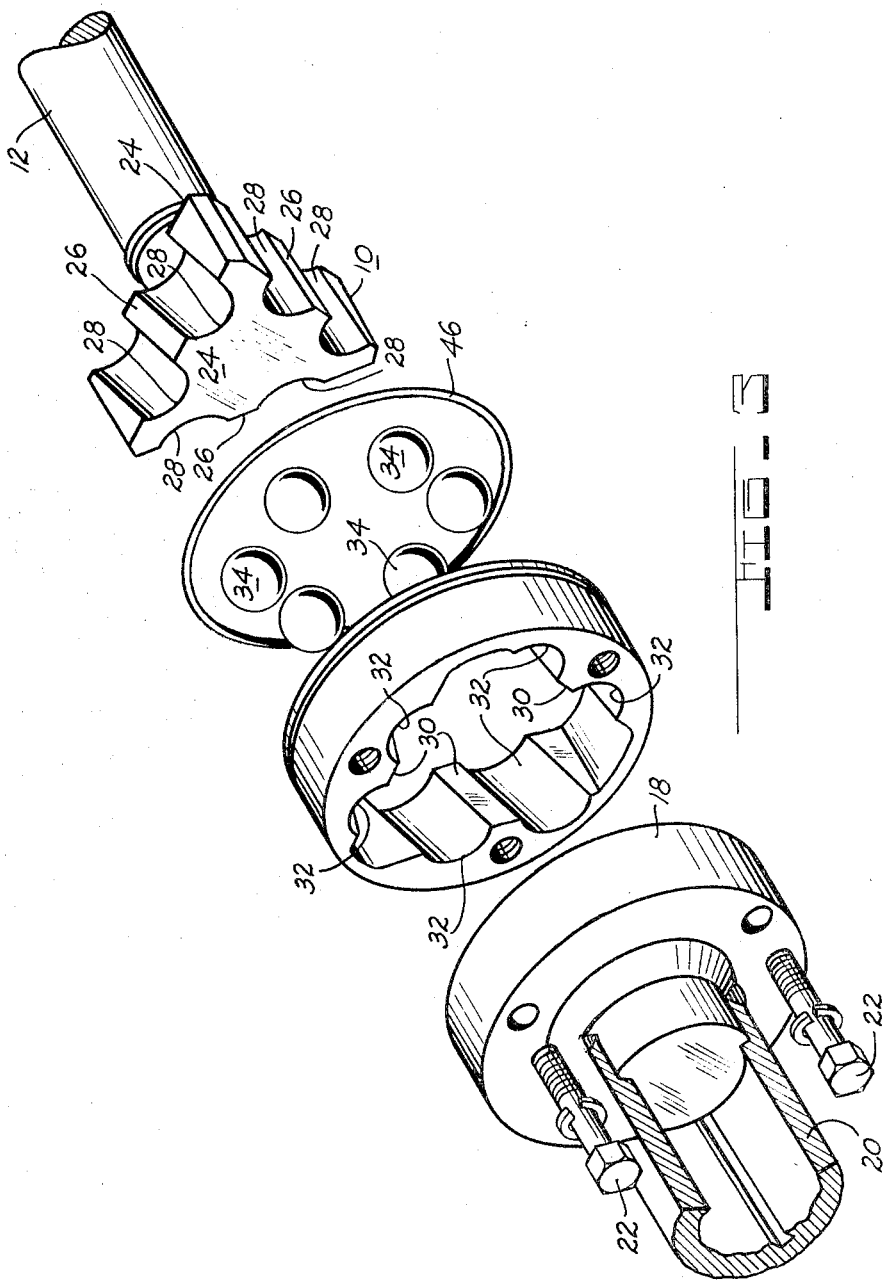

United States Patent Office 3,296,834
Patented Jan. 10, 1967

3,296,834
UNIVERSAL JOINT
Charles R. Grauel, South Bend, Ind., assignor to The Bendix Corporation, South Bend, Ind., a corporation of Delaware
Filed Feb. 18, 1965, Ser. No. 433,659
2 Claims. (Cl. 64—21)

This invention relates to universal joints and more particularly to universal joints of the constant velocity type in which torque is transmitted from a primary (input) shaft to a secondary (output) shaft through a variable angle by means of power transmitting elements.

More specifically, this invention relates to improvements in a constant velocity universal joint of the type described in Bellomo Patent No. 3,002,364 in which torque transmission between an inner member and an outer member, one of which is connected to an input shaft and the other of which is connected to an output shaft, is accomplished through means of a plurality of balls which operate in the bisecting plane of the angle formed between the axes of said shafts to thereby provide a constant speed ratio between the input and output shafts in all portions of the cycle of each rotation of the shafts, no matter what the relative angular position of the shafts and their axes may be. Each of the balls in this type of universal joint is engaged by two grooves of circular cross section, one of said grooves being located on the inner member and the other of said grooves being located on the outer member, said two grooves being located so as to intersect symmetrically on the previously mentioned bisecting plane.

Although the universal joint described in the above mentioned Bellomo Patent provides relative angular and axial movement between an input and output shaft, the cylindrical or spherical surfaces on which the ball race grooves are cut do not permit the achievement of maximum torque transmitting capacity per unit volume under all conditions because uniform or constant depth of the ball race grooves throughout their entire length is not possible.

Accordingly, it is an object of this invention to provide a universal joint of the type described which provides maximum torque transmitting capacity per unit volume under all conditions.

Another object of this invention is to provide a universal joint of the type described which utilizes a plurality of ball race grooves having a depth which is constant throughout the length thereof.

A further object of this invention is to provide a universal joint of the type described wherein the inner member thereof is formed in the shape of a prism and the outer member thereof has a corresponding prismatic bore therein for receiving said inner member.

More specifically, it is an object of this invention to provide a universal joint of the type described which includes an inner member formed in the shape of a triangular prism, an outer member having a corresponding triangular bore therein for receiving the inner member, and two straight constant depth parallel ball race grooves formed on each of the three prismatic faces of the inner member and on each of the corresponding prismatic faces in the triangular bore of the outer member, said ball race grooves on the inner member being crosswise with respect to the oppositely disposed ball race grooves of the outer member.

The above and other objects, features and advantages of the invention will become apparent from the following description taken in connection with the accompanying drawings which form a part of this invention and in which:

FIGURE 1 is a sectional view through a universal joint constructed in accordance with my invention which is taken along line 1—1 of FIGURE 2;

FIGURE 2 is a sectional view taken along line 2—2 of FIGURE 1; and

FIGURE 3 is an exploded isometric view showing the components of the universal joint shown in FIGURE 1, except for the lubricant retaining housing.

Referring to the drawings, it will be seen that numeral 10 indicates an inner member formed in the shape of a triangular prism having chamfered edges 11, said inner member being an integral part of shaft 12. If desired the inner member 10 may be fabricated as a separate piece and attached to the shaft 12 through suitable means, such as splines. An outer member 14 having a corresponding substantially triangular bore 16 therein for receiving the inner member 10 is adapted to be secured to the flange 18 of shaft 20 through suitable means such as bolts 22.

The inner member which, as previously stated, is formed in the shape of a triangular prism, contains two equal parallel equilateral triangular ends 24 (the corners of which are chamfered) and three faces 26 which are parallelograms. Each of the prism faces 26 contains two straight parallel ball race grooves 28 which are symmetrically disposed with respect to the midpoint of the face in which the grooves are located. The axes of each pair of inner parallel ball race grooves lie in a plane parallel to the axis of the inner prism member 10 but are angularly disposed with respect to said prism axis. Since the race grooves 28 are cut on the prism faces which are flat, the depth of the grooves will be substantially constant throughout the length thereof.

The bore 16 of the outer member 14, which receives the inner member 10, also in effect contains three prismatic faces 30, each of which contains two straight parallel ball race grooves 32 which are likewise symmetrically disposed with respect to the midpoint of the face in which the grooves are located. In this instance the axes of each pair of outer parallel ball race grooves lie in a plane parallel to the axis of the outer member 14, but are angularly disposed with respect to said axis. It will be understood that both the inner and outer ball race grooves 28 and 32 are inclined at the same angle but in opposite directions with respect to the axis of the inner prism member. Thus, when the inner and outer members are assembled, the mating ball race grooves will be crosswise with respect to each other. The depth of the race grooves 32 are also substantially constant throughout the length thereof.

Interposed in driving relationship between the inner and outer members 10 and 14 are six power transmitting balls 34 for transmitting torque from one of said members to the other of said members. A predetermined amount of clearance 36 is provided to permit the desired amount of relative angular and axial movement between the inner and outer members. Since the depth of the race grooves on both the inner and outer members is substantially constant, the torque transmitting capacity will be uniform regardless of the amount of relative axial movement between the inner and outer members. Constant velocity is assured at any relative position of the inner and outer members with regards to both angular and axial displacement by the geometry of the race grooves 28 and 32, which locate the balls 34 at all times in the homokinetic plane.

In order to protect the universal joint from ingress of dirt and the escape of lubricant, it will be noted from the drawing that a lubricant retaining housing 38 is utilized. This lubricant retaining housing, which is described and claimed in my application Ser. No. 378,602, filed June 29, 1964, includes a rigid outer tubular member 40 which is suitably connected to the outer diameter of the outer member 14, and a substantially frustoconical convoluted flexible inner member 42, which is bonded at one end to the tubular member 40 and is suitably connected at its other end to the shaft 12 by means such as clamp 44. An O-ring 46 is utilized to prevent leakage between the tubular member 40 and the outer member 14.

The several practical advantages which flow from my novel structural arrangement are believed to be obvious from the above description and other advantages may suggest themselves to those who are familiar with the art to which the invention relates.

Furthermore, although this invention has been described in connection with a certain specific embodiment, it will be obvious to those skilled in the art that various changes may be made in the form, structure, and arrangement of parts without departing from the spirit of the invention. For example, although the embodiment described herein utilizes a triangular prismatic shape, other configurations can be based on prisms with end surfaces in the shape of any other regular polygon.

Accordingly, I do not desire to be limited to the specific embodiment disclosed herein primarily for purposes of illustration, but instead desire protection falling within the scope of the appended claims.

Having thus described the various features of the invention, what I claim as new and desire to secure by Letters Patent is:

1. A universal joint comprising an inner member formed in the shape of a triangular prism, an outer member having a corresponding triangular bore therein for receiving said inner member, two straight parallel ball race grooves formed on each of the three prismatic faces of said inner member and on each of the corresponding prismatic faces in the triangular bore of said outer member, said race grooves on each of said faces of said inner member having the axes thereof in a plane parallel to the axis of said inner member but angularly disposed with respect thereto, said race grooves on each of said bore faces in said outer member having the axes thereof in a plane parallel to the axis of said outer member but angularly disposed with respect thereto, said race grooves on said inner member being crosswise with respect to the oppositely disposed race grooves of said outer member, a plurality of power transmitting balls disposed between said inner and outer members for transmitting torque from one of said members to the other of said members, each of said balls being engaged by a pair of said oppositely disposed crosswise race grooves, said ball race grooves each having a depth which is substantially constant throughout the length thereof, and clearance means between said inner and outer members for permitting relative angular and axial movement between said members.

2. A universal joint comprising an inner member formed in the shape of a triangular prism, an outer member having a corresponding triangular prismatic bore therein for receiving said inner member, two parallel ball race grooves located in each face of said triangular prism and on each corresponding face of said triangular bore, a plurality of power transmitting balls disposed between said inner and outer members for transmitting torque from one of said members to the other of said members, each of said balls being engaged by two crosswise race grooves, one of which is located in a prismatic face of said inner member and the other of which is located in a corresponding prismatic face of the bore of said outer member, said ball race grooves each having a depth which is substantially constant throughout the length thereof, and means between said inner and outer members for permitting relative angular and axial movement between said members.

References Cited by the Examiner

UNITED STATES PATENTS

| | | | |
|---|---|---|---|
| 2,309,939 | 2/1943 | Dodge | 64—21 |
| 2,762,211 | 9/1956 | Bellomo | 64—21 |
| 3,002,364 | 10/1961 | Bellomo | 64—21 |
| 3,092,982 | 6/1963 | Wild Haber | 64—21 |
| 3,218,827 | 11/1965 | Aucktor | 64—8 |

FRED C. MATTERN, JR., *Primary Examiner.*

HALL C. COE, *Examiner.*